United States Patent

[11] 3,577,188

| [72] | Inventors | John A. Thomson;<br>Brian R. Evill, Surrey, England |
|---|---|---|
| [21] | Appl. No. | 725,303 |
| [22] | Filed | Apr. 30, 1968 |
| [45] | Patented | May 4, 1971 |
| [73] | Assignee | Avery-Hardoll Limited<br>Chessington, Surrey County, England |

[54] COUNTER-OPERATED CONTROL SYSTEMS
4 Claims, 7 Drawing Figs.

[52] U.S. Cl. ..................................................... 340/164, 235/92
[51] Int. Cl. ..................................................... H04q 1/20
[50] Field of Search ........................................... 340/325, 164; 235/151.34, 92

[56] References Cited
UNITED STATES PATENTS
3,169,185  2/1965  Nines ........................... 235/92UX
3,221,149  11/1965  Giot et al. .................... 235/151.34X

*Primary Examiner*—John W. Caldwell
*Assistant Examiner*—Michael Slobasky
*Attorney*—Edwin E. Greigg ABSTRACT: A counter-operated control system which can be set to initiate at least two control operations, one at a count which is less by a predetermined number than a selected maximum count, the other comprises a series of counters counting, for example, units, tens, hundreds etc., a separate settable unit associated with each counter and means responsive to the arrival of the counters at at least two numbers bearing different relations to the settings of the associated settable units to provide successive operation initiating signals to initiate the two control operations.

COUNTER-OPERATED CONTROL SYSTEMS

This invention relates to counter-operated control systems for initiating control operations in response to the counting of numbers which are preset into the control system.

An example of the use of such control systems is in the delivery from bulk storage of preset quantities of liquid fuel, for example into tank vehicles used for the distribution of such fuel to retail supply stations or to bulk users such as people having oil fired space heating systems.

In delivering such preset quantities of liquids, it is essential that the flow rate of the liquid shall be reduced some time before the delivery is terminated, so that flow rate immediately before the final cutoff is relatively low, and no violent shock is produced by the closing of the valve, whilst the flow rate during the greater part of the delivery is substantially higher to enable relatively large quantities of liquid to be delivered in a relatively short time. Thus, the control system must produce, as well as a main control signal to initiate the closing of a shutoff valve, an auxiliary signal to initiate restriction of flow at an appropriate time before the preset quantity of liquid has been delivered. Similar requirements occur in other counter-operated control systems.

Hitherto, in liquid delivery apparatus, presetting has been performed by setting a counter to the quantity to be delivered and stepping it back to zero by means operated by a flowmeter, and the initiation of the flow restriction has been effected when the counter has been stepped back to a predetermined fixed value such as 10 units. It has been found desirable, however, to provide a liquid delivery apparatus in which the counter controlling the shutoff valve counts forwardly up to a preselected number and effects the closing of the shutoff valve when that number is reached, in which case the flow restriction must be brought into operation at a count number which will vary with the preset quantity of liquid.

It is the object of the invention to provide a counter-operated control system which enables this to be done.

According to the present invention a counter-operated control system comprises a counting device consisting of a series of counters counting respectively in units and in multiples of such units of progressively increasing orders, a separate settable unit associated with each counter, and means responsive to the arrival of the counters at at least two numbers bearing different predetermined relations to the settings of the associated settable units to provide signals for initiating control operations, whereby the system provides a main operation-initiating signal when the counting device reaches any prechosen number and also provides at least one auxiliary operation-initiating signal when the said counting device reaches a number smaller by a predetermined amount than the said prechosen number.

In one arrangement of apparatus according to the last preceding paragraph the settable unit associated with the units counter comprises two settable members arranged out of phase and operated by a common setting member so that they are always set to different numbers, the settable unit associated with a first higher order counter comprises a single settable member, and the settable units associated with succeeding higher order counters each comprise two settable members arranged out of phase and operated by a common setting member so that they are always set to different numbers, the arrival of each higher order counter at a position bearing a predetermined relation to the setting of the settable member or one of the settable members associated therewith providing a signal to prepare the next lower order counter and settable unit to provide a corresponding signal when the counter thereof also reaches a position bearing a predetermined relation to the setting of the settable member or one of the settable members thereof, the settable unit or units associated with the counter or counters other than the units counter and the highest order counter each including a device or devices which, according to the setting of that settable member, determine which of the two settable members associated with the next higher order counter and settable unit governs the production of the signal therefrom, and the auxiliary and main operation-initiating signals being produced respectively by the units counter arriving at positions bearing a predetermined relation to first one and then the other of its associated settable members.

The invention will now be described with reference to the accompanying drawings, in which.

Figure 1A:
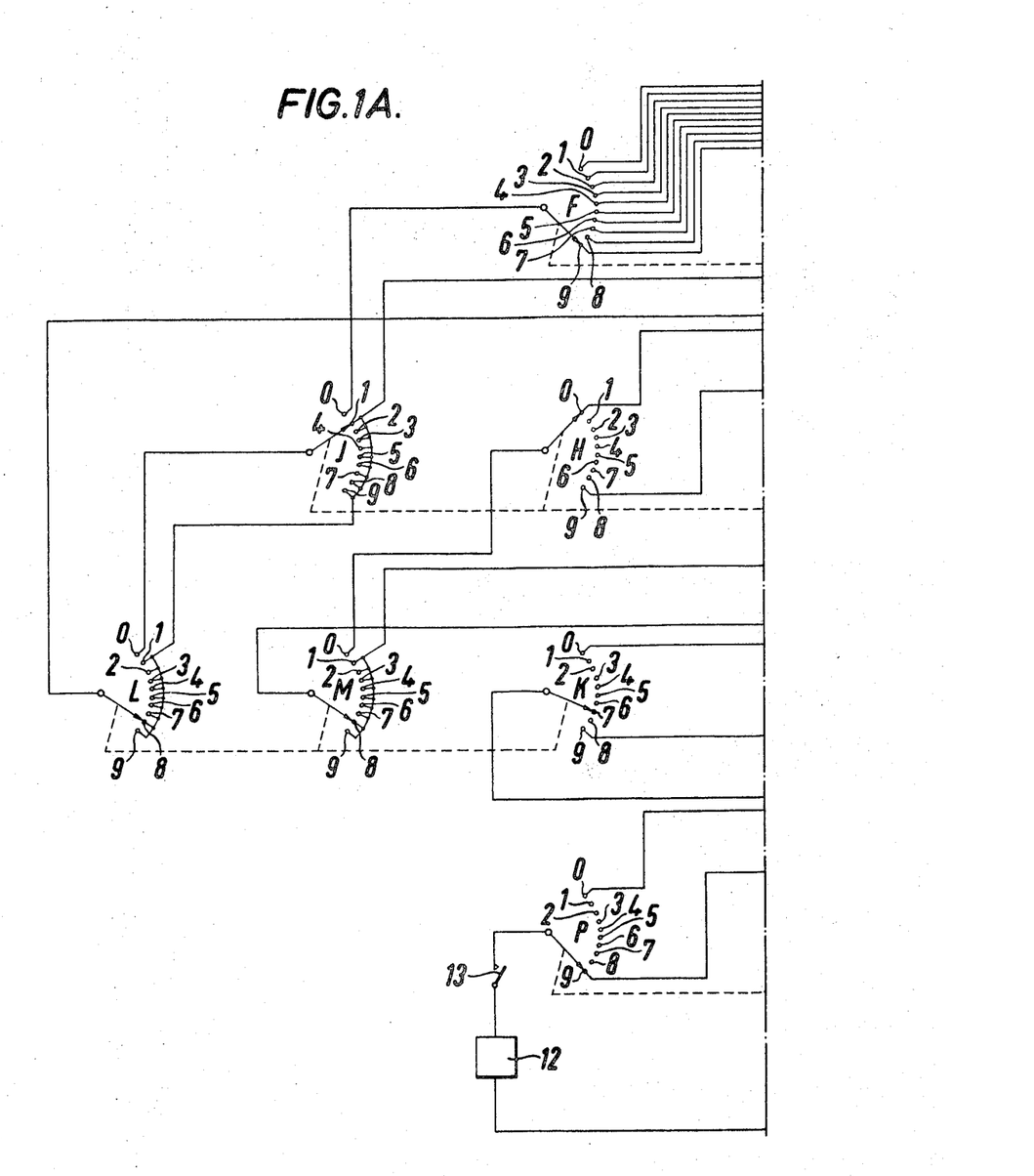
FIGS. 1A and 1B together form an electrical circuit diagram illustrating one embodiment of the invention.
Figure 1B:
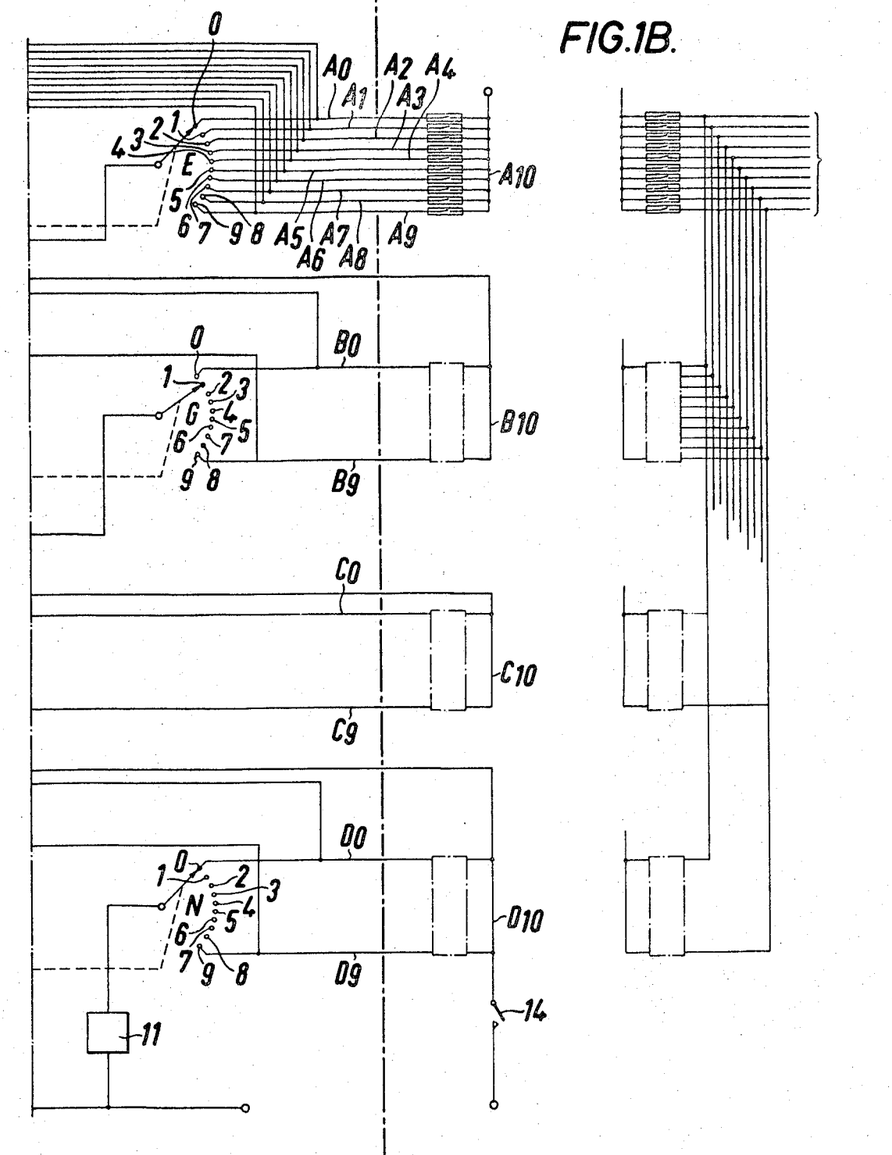

In the embodiment of the invention shown in FIGS. 1A and 1B, the counters, which are assumed to be driven by a liquid displacement meter (not shown) actuate electric switches, each counter closing a different one of an associated group of switches for each step of counting movement, and the setting means are rotary switches each having a number of contacts equal to the number of positions of the corresponding counter e.g. with decade counters each rotary switch has 10 positions. The "signals" are electric currents.

Referring to FIGS. 1A and 1B the counting device, which is not shown, is of the drum type and has drums counting units, tens, hundreds and thousands respectively. Each drum is arranged to operate 10 electric switches so that at each step of movement it closes a different one of the said switches. The groups of switches operated by the thousands, hundreds, tens and units drums respectively are indicated at A, B, C and D in FIG. 1.

Each group of counter-operated switches has the switches thereof, which may be reed switches, connected at one side to a common conductor 10 and at the other side, through separate channels (conductors), to contacts on one or more rotary switches. The conductors of each group of switches are referred to by the group reference with the addition of the suffixes 0 to 9 as shown for the group A in the drawing. The "channels" $A_0$ to $A_9$ in which the counter-operated switches associated with the "thousands" drum are incorporated are each connected to two ganged rotary switches E and F which are out of phase by one step so that when the switch wiper of switch E is connected to channel $A_0$ the switch wiper of switch F is connected to channel $A_9$ and so on.

The "channels" $B_0$ to $B_9$ in which the counter-operated switches associated with the "hundreds" drum are incorporated are each similarly connected to two ganged rotary switches G and H which are out of phase by one step, so that when the switch wiper of the switch G is connected to channel $B_0$ the switch wiper of the switch H is connected to channel $B_9$ and so on. A third rotary switch J ganged with the two rotary switches G and H has its 1 to 9 contacts connected together and to the wiper of the rotary switch E of the the "thousands" group, whilst the 0 contact is connected to the wiper of the rotary switch F of the "thousands" group. The wiper of the rotary switch J is in phase with the wiper of the rotary switch G. The channels $C_0$ to $C_9$ in which the counter-operated switches of group C associated with the "tens" drum are incorporated are each connected to only one rotary switch K, but this rotary switch is ganged with two additional rotary switches L and M each having its 1 to 9 contacts connected together. The 0 contacts of these switches are connected respectively to the wipers of the rotary switches J and H, the 1 to 9 contacts of the rotary switch L are connected to the 1 to 9 contacts of the rotary switch J, and the 1 to 9 contacts of the rotary switch M are connected to the wiper of the rotary switch G. The wipers of the rotary switches L and M are in phase with each other and displaced forwardly by one step with respect to the wiper of the switch K.

The channels $D_0$ to $D_9$ in which the counter-operated switches of group D associated with the "units" drum are incorporated are each connected to the 0 to 9 contacts of two rotary switches N and P the wipers of which are cut of phase by one step so that when the switch N is in the 0 position the switch P is in the 9 position and so on.

The wiper of switch L is connected to the common conductor 10 of the B group of counter-operated switches, the wiper of switch M is connected to the common conductor 10 of the C group of counter-operated switches, and the wiper of switch K is connected to the common conductor 10 of the D group of counter-operated switches.

The common conductor 10 of the A group of counter-operated switches is connected to one pole of a source of electric current supply, and the wipers of the rotary switches N and P are connected through relay coils 11 and 12 respectively to the other pole of the said source, a normally open switch 13 in the connection between the wiper of switch P and the relay 12 being closed by energization of the relay 11. The relays 11 and 12 control other switches in the circuits of solenoid operated valve means (not shown) so arranged that the energization of relay 11 introduces a flow restriction into the path of liquid fuel being delivered and the energization of relay 12 closes the said path. The relay 11, when energized, also closes a switch 14 connecting the common conductor 10 of the switch group D to the same pole of the electric supply source as is connected to the common conductor 10 of the switch group A.

The respective gangs of rotary switches are operated by rotary knobs having position indicators, the indications of the knob controlling the switches E and F corresponding with the positions of the switch E, the indications on the knob controlling the switches G, H and J corresponding with the positions of switch G, the indication on the knob controlling the switches K, L and M corresponding with the positions of the switches C and M and the indications on the knob controlling the switches N and P corresponding with the positions of the switch N.

The rotary switches J and M have similar functions, namely that if the knobs of the G, H, J and K, L, M switch combinations respectively are set to 9 they connect the wipers of the switches F and H respectively to the common connectors 10 of the switch banks B and C, but if those switch combinations are set to any other positions they isolate those switch wipers and prevent circuits being made through them. The rotary switch L, which is in series with the switch J, provides that a circuit can be made through the switches F and J only if the knob of the switch combination K, L, M is also set to 9. Thus a signal is passed through the rotary switch H only if the knob of the switch combination K, L, M is set at 9, and a signal is passed through the rotary switch F only if both the knobs controlling the switch combination K, L, M and the switch combination G, H, J are set to 9. This enables the initiation of the auxiliary operation to be effected when the hundreds and thousands counters show digits one less than those to which the corresponding knobs have been set, if the range between the number at which the auxiliary operation takes place and the number at which the final operation takes place are respectively below and above an even hundred or thousand.

With the various gangs of rotary switches set to any position there will be a combination of counter-operated switches, including one in each of the A, B, C, D groups, in which a circuit will be completed across the electric current supply, including the relay coil 11. The completion of this circuit as well as initiating the auxiliary operation, will close the switch 14. As will now be explained with reference to a particular combination of rotary switch positions, the relay coil 11 will be energized at a count of a predetermined number of units less than that set up on the switch knob indicators, in this case 10 units, and the relay coil 12 will be energized at a count of one less than the number set up on the switch knob indicators, there being a lag in the closing of the shutoff valve sufficient to allow the passage of the last unit quantity of liquid fuel.

Assuming the unit quantity of liquid fuel to be 1 gallon, the quantity set up with the switches in the position shown in the drawing is 0180 gallons. Thus the rotary switches E and F are set to 0 and 9 respectively, the rotary switches G, H and J are set to 1, 0 and 1 respectively, the rotary switches K, L and M are set to 7, 8 and 8 respectively and the switches N and D are set to 0 and 9 respectively. Since the thousands counter remains at 0 all the time, the counter-operated switch in channel $A_0$ remains closed providing an electric current path through rotary switches E, J and L up to the common conductor 10 of the switch group B. Until 100 gallons have been delivered the hundreds counter remains at 0 and the current path is extended through rotary switch H up to the 0 contact of rotary switch M, which contact is isolated. When the count reaches 100, the current path is extended through the rotary switch G to the 1 contact of the rotary switch M, and so to the common conductor 10 of the C group of counter-operated switches. The next time the tens counter reaches 7, the current circuit is extended through the rotary switch K to the common conductor 10 of the D group of rotary switches and since, at this time, the units drum is at 0, a circuit is completed through the relay coil 11 which brings the flow restricting device into operation and closes the switches 13 and 14. Flow of liquid continues at a reduced rate until the units counter reaches the 9 position and a circuit is completed through the switch 14 and relay coil 12 to initiate closing of the shutoff valve. A final gallon of liquid is delivered after the closing of the shutoff valve has been initiated, so that the total delivery is 180 gallons.

If the quantity set up to be delivered is such that the quantities at which flow restriction and final closure take place are respectively above and below an even hundred or thousand, the current paths set up are somewhat different from those described above. For example, if the quantity set up is 2005 gallons, the initial setting of the switches E and F is to the 2 and 1 positions respectively, the initial setting of the switches G, H and J is to the 0, 9 and 0 positions respectively, the setting of the switches K, L and M is to the 9, 0 and 0 positions respectively and the setting of the switches N and P is to the 5 and 4 positions respectively. With this setting, when the thousands counter reaches the 1 position a current path is set up through the switches F, J and L to the common conductor 10 of the B group of counter-controlled switches. When the hundreds counter next reaches the 9 position this path is extended through the switches H and M to the common conductor 10 of the C group of switches, and when, after this, the tens counter next reaches the 9 position the path is extended through the switch K to the common conductor 10 of the D group of switches. Thus, when the units counter next reaches the 5 position a circuit is completed through the relay coil 11 to reduce the liquid flow, the quantity delivered then being 1995 gallons. Liquid continues to flow at a reduced rate, but when the thousands counter reaches the 2 position the circuit is broken at the switch L. However, the switch 14 has been closed, maintaining the circuit through the coil of the relay 11, and the relay 12 is therefore energized when the units counter reaches the 4 position to initiate closing of the shutoff valve.

Taking as another example, a quantity of 309 gallons, the settings of the rotary switches will be as follows:
Switches E and F to 0 and 9;
Switches G, H and J to 3, 2 and 3;
Switches K, L and M to 9, 0 and 0;
Switches N and P to 9 and 8.

When the hundreds counter reaches the 2 position, the thousands counter being at 0, a current path will be set up through rotary switches E, J, L, H and M to the common conductor 10 of the counter-operated switch group C and, when the tens counter reaches the 9 position, the current path will be extended through the switch K to the common conductor 10 of the counter-operated switch group D, so that when the units counter next reaches the 9 position a circuit will be completed through the relay coil 11. When the hundreds counter reaches the 3 position the tens counter being at 0, the current path will be broken at the switch M, but the closing of the switch 14 by the relay 11 causes a circuit to be completed through the relay coil 12, so that when the units counter next reaches the 9 position a current path will be completed through the rotary switch P to the relay coil 12.

It will thus be seen that, with any number set up on the rotary switches, the relay coil 11 will be energized at a count of 10 less than the number set up, and the relay coil 12 will be energized at a count of 1 less than the number set up.

Figure 2A:
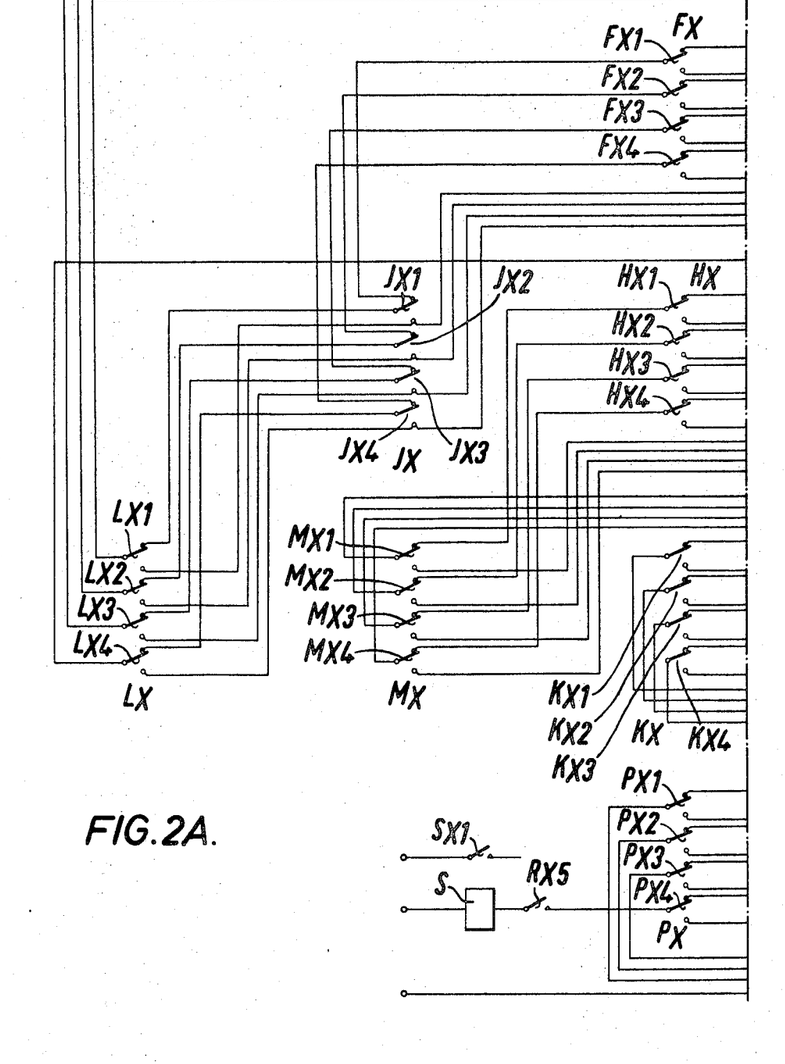
FIGS. 2A and 2B together form an electrical circuit diagram illustrating a second embodiment of the invention.
Figure 2B:
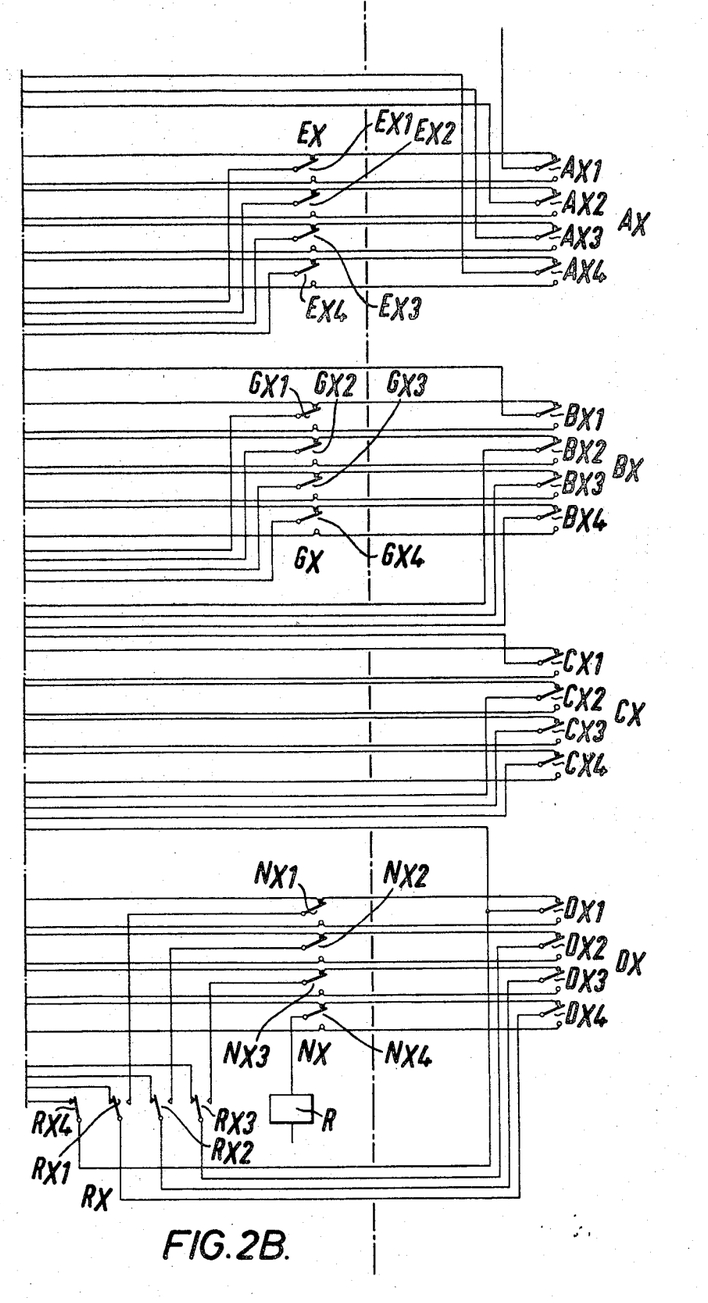

In the embodiment of the invention shown in FIGS. 2A and 2B, the groups of counter-operated reed switches A, B, C and D, comprising one switch for each digit, are replaced by sets of four two-way switches $A_X$, $B_X$, $C_X$, $D_X$ each set of switches being operated by one of the counters according to a binary coded decimal code, so that the 10 possible combinations of switch positions each represent one digit (0 to 9). Similar sets of four two-way switches $E_X$ to $P_X$, replace the rotary switches E to P of FIGS. 1A and 1B. The four switches of each set $A_X$, $B_X$, $C_X$, and $D_X$ are numbered 1, 2, 3 and 4 respectively as indicated on the drawing for the switches of set $A_X$, and the four switches of each of the sets $E_X$ to $P_X$ are similarly numbered. Each fixed contact of each switch $A_{X1}$, $A_{X2}$, $A_{X3}$, $A_{X4}$, is connected by a conductor to the corresponding contacts of the switches $E_{X1}$, $E_{X2}$, $E_{X3}$ and $E_{X4}$ and to the corresponding contacts of the switches $F_{X1}$, $F_{X2}$, $F_{X3}$, and $F_{X4}$. Similarly, the fixed contacts of the switches of set $B_X$ are connected to the fixed contacts of the switches of sets $G_X$ and $H_X$, the fixed contacts of the switches of set $C_X$ are connected to the fixed contacts of the switches of set $K_X$ and the fixed contacts of the switches of set $D_X$ are connected to the fixed contacts of the switches of the sets $N_X$ and $P_X$. The moving contacts of the switches of the set $E_X$ are each connected to one fixed contact of a different one of the switches of the set $J_X$ and to one fixed contact of a corresponding one of the set of switches $L_X$. The moving contacts of the switches of the set $F_X$ are each connected to the other fixed contact of the switch in the set $J_X$ of which one fixed contact is connected to the corresponding switch in the set $E_X$. The moving contact of each switch in the set $J_X$ is connected to the fixed contact of a corresponding switch in the set $L_X$ other than the fixed contact thereof which is connected to a switch in the set $E_X$. The moving contacts of the switches $L_{X1}$, $L_{X2}$ and $L_{X3}$ in the set $L_X$ are connected respectively to the moving contacts of the counter-operated switches $A_{X2}$, $A_{X3}$ and $A_{X4}$, and the moving contact of the switch $L_{X4}$ is connected to the moving contact of the counter-operated switch $B_{X1}$. The moving contact of the switch $A_{X1}$ is connected to a source of electric current supply.

The moving contacts of the switches in set $G_X$ are each connected to one fixed contact of a switch in the set $M_X$, and the moving contacts of the switches in the set $H_X$ are each connected to the other fixed contact of the switch in the set $M_X$ of which one fixed contact is connected to the corresponding switch in the set $G_X$. The moving contacts of the switches $M_{X1}$, $M_{X2}$ and $M_{X3}$ are connected respectively to the moving contacts of the switches $B_{X2}$, $B_{X3}$ and $B_{X4}$, whilst the moving contact of the switch $M_{X4}$ is connected to the moving contact of the switch $C_{X1}$.

The moving contacts of the switches $K_{X1}$, $K_{X2}$ and $K_{X3}$ of the set $K_X$ are connected respectively to the moving contacts of the switches $C_{X2}$, $C_{X3}$ and $C_{X4}$, and the moving contact of the switch $K_{X4}$ is connected to the moving contact of the switch $D_{X1}$.

The moving contacts of the switches $N_{X1}$, $N_{X2}$ and $N_{X3}$ are each connected to one fixed contact of one of four switches $R_{X1}$, $R_{X2}$ and $R_{X3}$ of a set of switches $R_X$ controlled by a relay R, the moving contacts of the switches $P_{X1}$, $P_{X2}$ and $P_{X3}$ being similarly connected to the other fixed contacts of the said switches $R_{X1}$, $R_{X2}$ and $R_{X3}$. The moving contacts of the switches $R_{X1}$, $R_{X2}$ and $R_{X3}$ are respectively connected to the moving contacts of the switches $D_{X4}$, $D_{X3}$ and $D_{X2}$. The fourth switch $R_{X4}$ of the set of switches $R_X$ has one blank fixed contact, the other fixed contact being connected to the same pole of the electric supply as is connected to the switch $A_{X1}$, and the moving contact of the switch $R_{X4}$ is connected to the moving contact of the switch $D_{X1}$. The moving contact of the switch $N_{X4}$ is connected through the coil of the relay R to the pole of the electric supply opposite to that which is connected to the switch $A_{X1}$, and the moving contact of the switch $P_{X1}$ is connected, through a relay S, and contacts $R_{X5}$ closed by the energization of the relay R, to the same pole of the electric supply as the relay R. When the relay R is deenergized, the switches $R_{X1}$, $R_{X2}$ and $R_{X3}$ are in positions to connect their moving contacts with the moving contacts of the switch set $P_X$, and the switch $R_{X4}$ has its moving contact connected to the current supply. Energization of this relay, besides reversing these switches and closing the contacts $R_{X5}$ also closes contacts (not shown) to bring the flow restricting device into operation. Energization of the relay S closes contacts $S_{X1}$ to close the shutoff valve.

The operation of this arrangement is generally similar to that of the previous arrangement, in that, when the switch sets $A_X$, $B_X$ and $C_X$ reach positions corresponding to the settings of the switch sets $F_X$, $H_X$, $K_X$ and $P_X$ the relay R is operated to bring the flow restricting device into operation and also to prepare the relay S for operation by closing the contacts $R_S$, whereas when the switch sets $A_X$, $B_X$, $C_X$ and $D_X$ reach positions corresponding to the settings of the switches $E_X$, $G_X$ and $H_X$ the relay S is energized to close the shutoff valve.

The switch sets $E_X$ and $F_X$, the switch sets $G_X$ and $H_X$ and the switch sets $N_X$ and $P_X$ are so arranged in relation to their setting knobs that for any setting the sets $F_X$, $H_X$ and $P_X$ are one digit behind the sets $E_X$, $G_X$ and $N_X$, the switch set $J_X$ is in the same position as the switch set $G_X$ and the switch sets $L_X$ and $M_X$ are one digit ahead of the switch set $K_X$.

During a delivery operation, when the switches of the set $A_X$ reach positions corresponding to the setting of the switches in the set $F_X$, a circuit is made from the switch $A_{X1}$ to the moving contact of the switch $C_{X1}$ through all the contacts of the $A_X$ and $B_X$ sets in series, if the setting knobs of both the $G_X$, $H_X$, $J_X$ switches and the $K_X$, $L_X$, $M_X$ switches are at the "9" position. Otherwise, no circuit is made to the moving contact of the switch $C_{X1}$ until the switches of the set $A_X$ reach positions corresponding to the setting of the switches in the $E_X$ set. When, subsequently, the switches of the $C_X$ group reach settings corresponding to those of the $K_X$ group, the circuit is extended to the moving contact of the switch $D_{X1}$. When, again subsequently the switches of the $D_X$ set reach positions corresponding to the setting of the switches of the $P_X$ set the relay R is energized, and when the said switches of the $D_X$ group reach positions corresponding to the settings of the $N_X$ group the relay S is energized.

The switches of the sets $E_X$ to $P_X$ inclusive are preferably two-way microswitches operated by setting cams.

The settable units, instead of being switches may be fixed resistances all connected across a source of electric current and each provided with 10 tappings adapted to be swept by moving wipers so that different e.m.f.'s are derived from the respective resistances depending on the positions of the wipers in relation thereto. The counter-operated units may be similar resistances all connected at one end to one pole of the electric current supply, the thousands unit being permanently connected across the supply and the remaining counter-operated units being brought into the circuit in succession as each higher unit reaches a position of coincidence with the corresponding settable units. A comparator is provided at each stage (thousands, hundreds, tens and units) which passes current to the next stage only when coincident e.m.f.'s are applied to it from the settable units and the counter-operated units.

Figures 3A, 4:
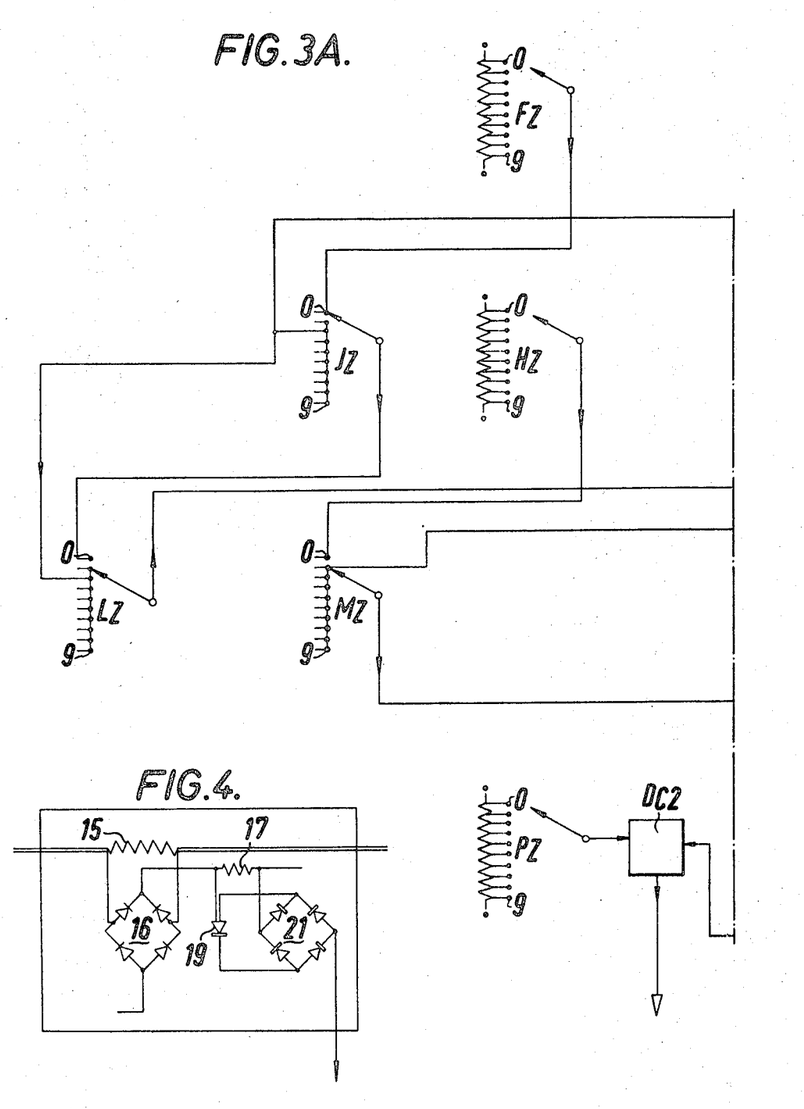
FIGS. 3A and 3B together form an electrical circuit diagram illustrating a third embodiment of the invention.
FIG. 4 is an electrical circuit diagram of one of the comparator units shown in FIGS. 3A and 3B.
Figure 3B:
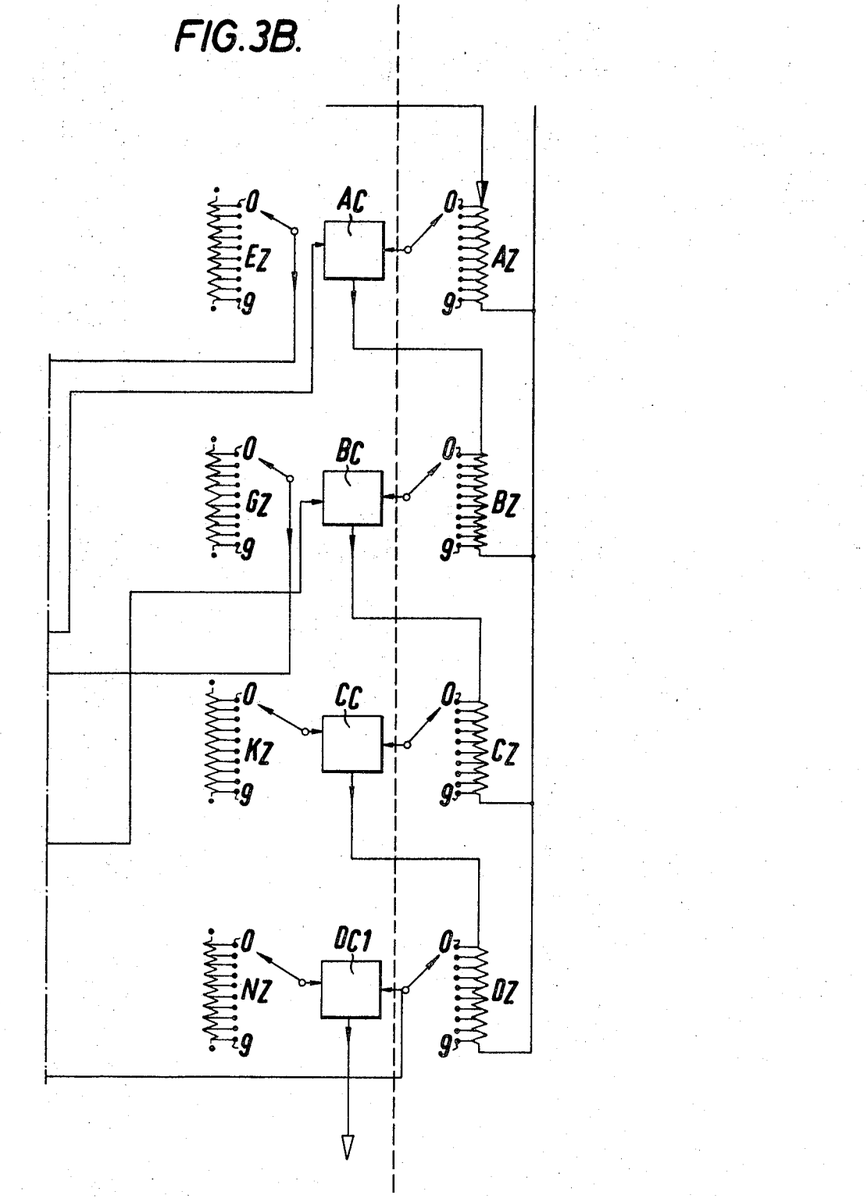

Referring to FIGS. 3A and 3B of the drawings, the resistances associated with the thousands, hundreds, tens and units counter elements are shown at $A_Z$, $B_Z$, $C_Z$ and $D_Z$ respectively. Two resistances $E_Z$ and $F_Z$ take the place of the switch groups E and F in FIG. 1, and the places of the switch groups G, H, K, N and P of FIG. 1 are taken by resistances $G_Z$, $H_Z$, $K_Z$, $N_Z$ and $P_Z$ respectively. The switch groups J, L and M are replaced by contact assemblies $J_Z$, $L_Z$ and $M_Z$ each having an isolated 0 contact and connected 1 to 9 contacts swept by a wiper.

Five comparator units are provided, being indicated on the drawing by the references $A_C$, $B_C$, $C_C$, $D_{C1}$ and $D_{C2}$ one side of each of the comparators $A_C$, $B_C$ and $C_C$ being connected respectively to the wipers of the resistances $A_Z$, $B_Z$ and $C_Z$ and both the comparators $D_{C1}$ and $D_{C2}$ having one side connected to the wiper of the resistance $D_Z$. The other side of the comparator $A_C$ is selectively connectable through the contact assemblies $J_Z$ and $L_Z$ to the wipers of the resistances $E_Z$ and $F_Z$, the other side of the comparator $B_C$ is selectively connectable through the contact assembly $M_Z$ to the wipers of the resistances $G_Z$ and $H_Z$, and the other side of the comparator $C_C$ is connected to the wiper of the resistance $K_Z$. The other sides of the comparators $D_{C1}$ and $D_{C2}$ are connected respectively to the wipers of the resistances $N_Z$ and $P_Z$. The outputs of the comparators $D_{C1}$ and $D_{C2}$ are connected respectively to relays, not shown, operating the flow restricting device and the shutoff valve.

The operation of this form of the invention is analogous with that of the arrangement described with reference to FIGS. 1A and 1B, current being passed from each comparator $A_C$, and $B_C$ and $C_C$ to the next lower order resistance $B_Z$, $C_Z$ or $D_Z$ when coincidence is achieved between the two inputs to the comparator, and the determination whether the coincidence is achieved in the $A_C$ or $B_C$ comparators in accordance with the settings of the $E_Z$ or $F_Z$ resistances in the case of the comparator $A_C$, or the settings of the $G_Z$ or $H_Z$ resistances in the case of the comparator $B_C$, depending on the settings of the contact assemblies J, L and M. When the comparator $C_C$ reaches a coincidence state, current is passed to the resistance $D_Z$. When the comparator $D_{C1}$ reaches the coincidence state the relay connected thereto is energized to operate the flow restrictor and close a switch in the connection between the comparator $D_{C2}$ and the relay operated thereby, and when a coincidence state is subsequently reached in the comparator $D_{C2}$ the relay connected thereto is energized to close the shutoff valve. Each of the comparators $A_C$, $B_C$, $C_C$, $D_{C1}$ and $D_{C2}$ is of the form illustrated by the circuit diagram of FIG. 4, the two inputs being connected one to the other through a resistor 15, the ends of the resistor being connected to opposite points of a full-wave rectifier bridge 16 the other two opposite points of which are connected respectively to one pole of the electric current supply and, through another resistor 17 to the other pole of the said supply. The resistor 17, at its end adjacent the rectifier bridge 16 is connected to the gate electrode of a silicon controlled rectifier 19 connected between two opposite points of another full-wave rectifier bridge 21 the other two opposite points of which are connected respectively to the electric current supply and to the counter resistor of the next counting stage of the apparatus. When the e.m.f.'s applied to both ends of the resistor 15 are equal, the silicon controlled rectifier is triggered to pass current and so produce the signal to the next counting stage.

Whilst the invention has been so far described as embodied in an electrical system using mechanical switches, it will be evident that an electronic system could be used, the switches being replaced by solid-state logic devices. As a further alternative, a fluid pressure system could be used, the gas or liquid constituting the pressure medium being directed into the desired paths by valves or fluid logic devices replacing the switches of the arrangement shown in FIGS. 1A and 1B. If valves were used, cams replacing the movable switch contacts would be employed to actuate the respective groups of switches. If fluid logic devices were used, they would be actuated by low-pressure pneumatic switching signals.

It will be evident that the control system according to the invention can be used for purposes other than the controlling of preset deliveries of liquid, and that the count at which the first control operation is performed may be less than the number set up by a number other than 10. Moreover, the groups of switches A, B, C, D etc., may contain numbers of switches other than 10, the sets of switches $A_X$, $B_X$, $C_X$, $D_X$ etc., may be arranged to provide a code giving less or more than 10 digits, or the resistances $A_Z$, $B_Z$, $C_Z$, $D_Z$, etc., may provide less or more than 10 takeoff positions.

We claim:

1. A counter-operated control system comprising a counting device consisting of a series of counters counting respectively in units and in multiples of such units of progressively increasing orders, a separate settable unit associated with each counter, the settable unit associated with the units counter comprises two settable members arranged out of phase and operated by a common setting member so that they are always set to different numbers, the settable unit associated with a first higher order counter comprises a single settable member, and the settable units associated with succeeding higher order counters each comprise two settable members arranged out of phase and operated by a common setting member so that they are always set to different numbers, the arrival of each higher order counter at a position bearing a predetermined relation to the setting of the settable member or one of the settable members associated therewith providing a signal to prepare the next lower order counter and settable unit to provide a corresponding signal when the counter thereof also reaches a position bearing a predetermined relation to the setting of the settable member or one of the settable members thereof, the settable unit or units associated with the counter or counters other than the units counter and the highest order counter each including a device or devices, which according to the setting of that settable member, determine which of the two settable members associated with the next higher order counter and settable unit governs the production of the signal therefrom, and the auxiliary and main operation-initiating signals being produced respectively by the units counter arriving at positions bearing a predetermined relation to first one and then the other of its associated settable members, whereby the system provides a main operation-initiating signal when the counting device reaches any prechosen number and also provides at least one auxiliary operation-initiating signal when the said counting device reaches a number smaller by a predetermined amount than the said prechosen number.

2. A counter-operated control system according to claim 1, wherein each counter comprises a set of electrical switches each closed when the counter is at a position corresponding to a different number and each settable member comprises an electric switch having a number of positions equal to the number of counter switches.

3. A counter-operated control system according to claim 1, wherein each counter comprises a set of double-throw electric switches arranged in accordance with a binary coded decimal code and the settable members are corresponding sets of similar switches.

4. A counter-operated control system according to claim 1, wherein each counter comprises a resistance member and a wiper member sweeping over tappings on the said resistance, the settable members comprise similar resistances, e.m.f.'s taken from each counter resistance and settable member resistance in accordance with the wiper positions being applied to comparators which provide the signals only when the said e.m.f.'s are equal.